United States Patent [19]

Hardesty et al.

[11] 3,954,089
[45] May 4, 1976

[54] DIESEL ENGINE

[75] Inventors: Lee Roy Hardesty; James Alfred Sharpsteen, both of Cedar Falls, Iowa

[73] Assignee: Deere & Company, Moline, Ill.

[22] Filed: July 16, 1971

[21] Appl. No.: 163,377

[52] U.S. Cl. .............................. 123/30 C; 123/30 D; 123/32 B
[51] Int. Cl.² .......................................... F02B 3/00
[58] Field of Search ............................... 123/30, 32

[56] References Cited
UNITED STATES PATENTS

| | | | |
|---|---|---|---|
| 1,692,107 | 11/1928 | Archaouloff | 123/32 |
| 2,699,358 | 1/1955 | Sonderegger | 123/32 X |
| 2,766,744 | 10/1956 | Steiger | 123/32 X |
| 2,851,019 | 9/1958 | Fleming et al. | 123/32 |
| 2,959,161 | 11/1960 | Bottger | 123/32 |
| 2,977,942 | 4/1961 | Reynolds | 123/32 |
| 3,244,159 | 4/1966 | Meurer | 123/32 |
| 3,302,627 | 2/1967 | Morris | 123/32 |
| 3,335,707 | 8/1967 | Heinrich | 123/30 |

OTHER PUBLICATIONS

Reprint from Diesel & Gas Engine Catalog, Vol. 26 (4 pp.), A New Concept of Diesel Combustion by P. H. Schweitzer, Automotive Industries, June 15, 1956.
Fuel Injection and Controls by Paul G. Burman and Frank DeLuca, Feb. 1, 1962, p. 65.

*Primary Examiner*—Charles J. Myhre
*Assistant Examiner*—Paul Devinsky

[57] ABSTRACT

A direct-injection, open-chamber, compression-ignition engine is designed to operate at high outputs with a minimum production of oxides of nitrogen by a combination of fuel-air ratios, air-delivery swirl, fuel injection rates and pattern and diameter and configuration of combustion chamber whereby noxious emissions are substantially reduced.

4 Claims, 12 Drawing Figures

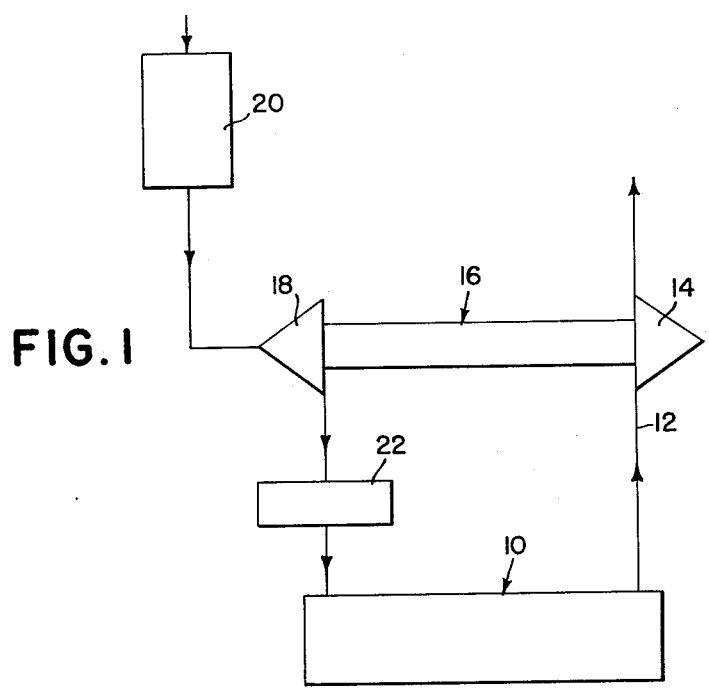
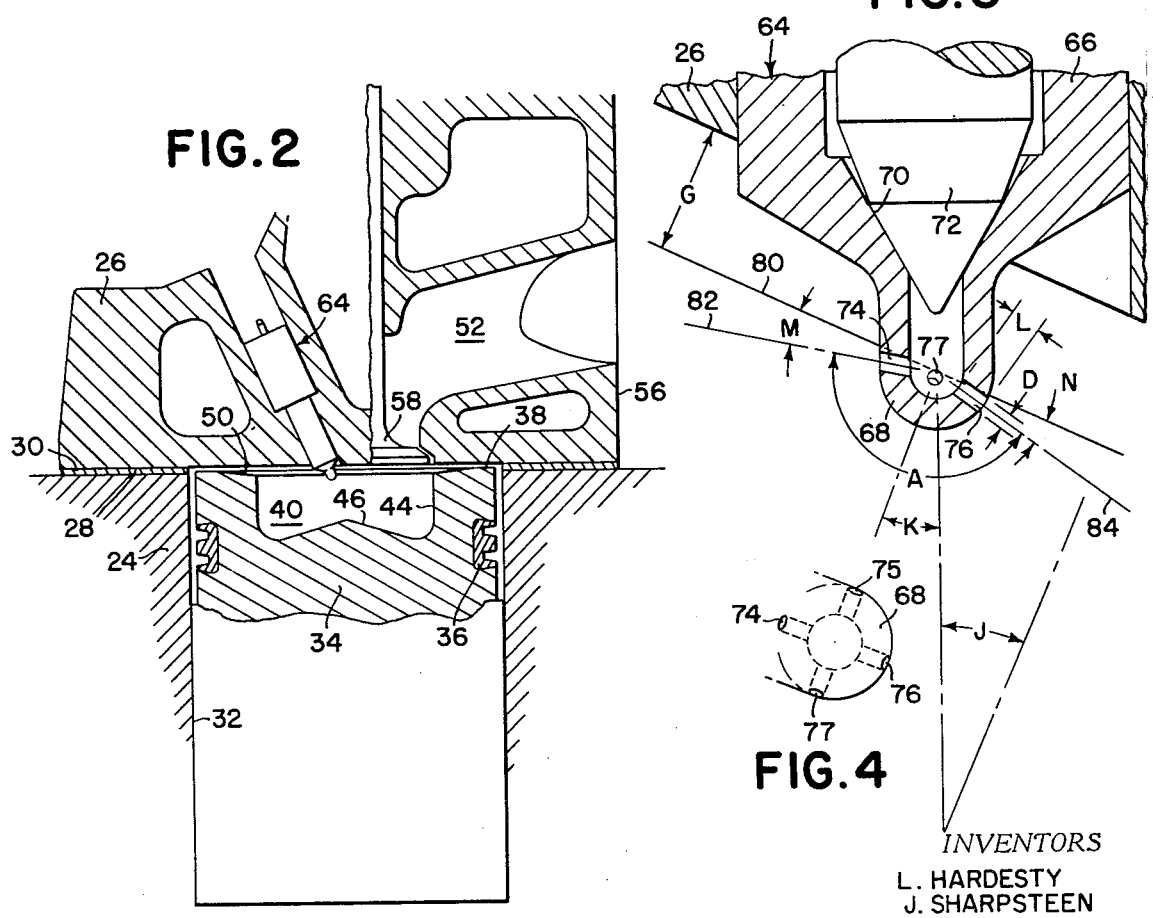

INVENTORS
L. HARDESTY
J. SHARPSTEEN

INVENTORS
L. HARDESTY
J. SHARPSTEEN

DIESEL ENGINE

BACKGROUND OF THE INVENTION

This invention relates to a diesel engine, and more particularly to an improved combustion system for an open chamber diesel engine, which produces a controlled burning rate of the fuel during combustion and the expansion stroke of the engine to produce good engine performance with low gaseous emissions.

As is well known, increasing concern over air pollution has resulted in controls over the gaseous emissions of internal combustion engines, both at the Federal and State levels. The State of California already has emission regulations for diesel engines, which will apply to new machines in the 1973 model year, plus more stringent standards which will apply to 1975 or later model year machines. It is considered quite likely that other states will adopt similar regulations.

The 1973 California regulations specify that the exhaust emissions shall not exceed 16 grams hydrocarbons plus oxides of nitrogen or 40 grams carbon monoxide per brake horsepower hour, when the engine is run under a standard procedure. The 1975 regulations reduce the hydrocarbons plus oxides of nitrogen to 5 grams and the carbon monoxide to 25 grams per brake horsepower hour. While the carbon monoxide limits are not difficult to meet, the hydrocarbons plus oxides of nitrogen standard will present a problem, which arises, not because of the unburned hydrocarbons, which can be controlled, but as a result of the oxides of nitrogen. While the 1973 standards will not present a problem for most commercially available diesel engines, the 1975 standards will, since, according to the data available, the level of oxides of nitrogen emission in most diesel engines is such that the 1975 standards cannot be met with said engines.

While the mechanics of the production of oxides of nitrogen in the combustion process are not completely known, it is believed that such oxides are formed as the result of the breakdown of the $N_2$ molecules in the combustion air as a result of high combustion temperatures.

Concurrent with the increased concern over exhaust emissions, there has been a trend toward higher horsepower machines. In many cases, the higher horsepowers are achieved by turbocharging the engines, and the higher temperatures and pressures which exist in turbocharged engines have usually resulted in an increase in oxides of nitrogen emissions. Some of the turbocharged engines also use intercoolers between the turbocharger and the intake port to reduce the intake air temperature and thereby increase horsepower.

Many commercial diesel engines utilize a direct injection, valve-in-head-type design, with an open combustion chamber in the piston. Heretofore, when engines of this type have been operated at high output levels, the engines had had poor exhaust emission characteristics, particularly oxides of nitrogen emissions.

SUMMARY OF THE INVENTION

According to the present invention, there is provided an improved combustion system for an open chamber direct injection diesel engine, which produces relatively low oxides of nitrogen emissions at high output levels. More particularly, a combustion system is provided wherein the combustion is controlled to provide temperatures that do not produce undesirable amounts of oxides of nitrogen. An important feature of the invention resides in the provision of such a combustion system in a turbocharged or turbocharged and intercooled engine.

Also according to the invention, the improved combustion system features a valve-in-head engine with a fuel injection nozzle and an open combustion chamber, preferably in the piston and coaxial with the piston, the fuel injection orifices being so arranged that they spray the fuel on the combustion chamber walls at equal heights around the chamber and having a ratio between their diameter and length to give good penetration of fuel during the injection process. Also, according to the invention, air is introduced through the intake port and the intake valve to give a vortexing flow or swirl within a particular range of rotational speeds, so that the rotating air deflects the fuel sprays for good air-fuel mixture during combustion.

Another feature resides in the selection of the proper ratio between the diameter of the cylinder and the diameter of the combustion chamber, to provide the desired impingement of fuel on the wall of the combustion chamber and to provide an optimum relationship between the fuel spray and the combustion air, to control the burning rate and thereby control the peak combustion temperatures.

Also, according to the invention, the clearance between the top of the piston and the bottom of the cylinder head at the top of the stroke is maintained at a minimum, so that the air betweem the piston and cylinder head will be accelerated into the combustion chamber during the compression stroke, the minimum clearance assuring a maximum percent of air available in the combustion chamber.

Another feature of the invention resides in the provision of a taper on the top face of the piston around the combustion chamber, so that a uniform clearance between the top of the piston and the cylinder head is maintained under full load operation, since the central portion of the piston normally has a greater thermal growth than the peripheral portions.

Still another feature of the combustion system resides in an optimum combination of air flows, air fuel ratio, combustion chamber and cylinder diameters, nozzle design, injection rates and time, fuel spray patterns, and combustion chamber design in a high output engine to give a controlled burning rate of the fuel and thereby prevent the formation of excessive amounts of oxides of nitrogen.

BRIEF DESCRIPTION OF THE DRAWINGS

FIG. 1 is a schematic illustration of a turbocharged, intercooled engine embodying the invention.

FIG. 2 is a vertical section through a portion of the cylinder head and a piston showing the combustion chamber of an engine embodying the invention, with a portion of the cylinder head being removed to disclose a part of the intake valve and port.

FIG. 3 is an enlarged axial section through the end of a fuel injection nozzle.

FIG. 4 is an end projection of the nozzle tip shown in FIG. 3.

DESCRIPTION OF A PREFERRED EMBODIMENT

Figure 5:
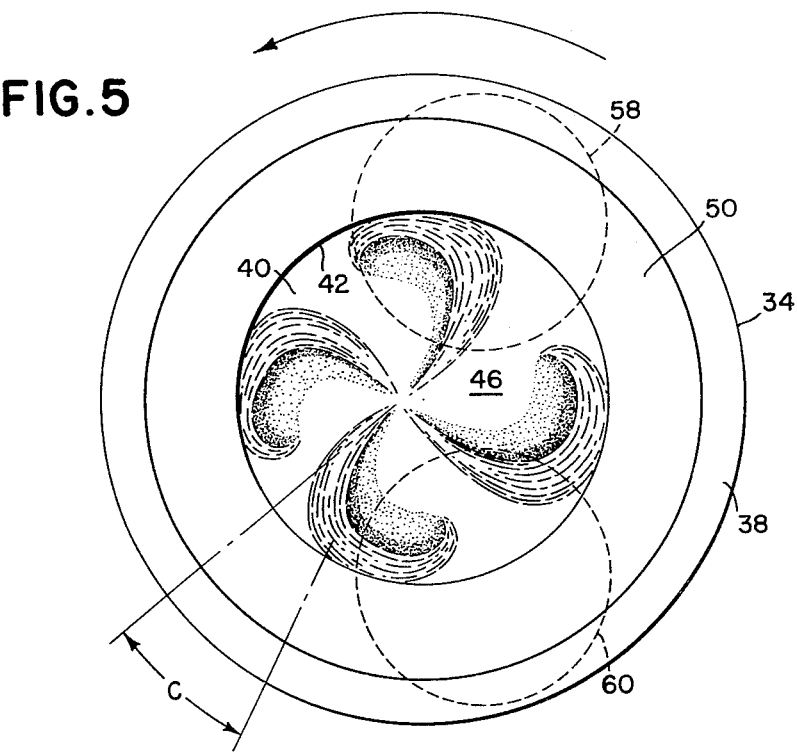
FIG. 5 is a schematic plan view of the top of the piston showing the fuel spray pattern in the combustion chamber and with the valves shown in dotted lines.

The invention is embodied in a four-stroke cycle diesel engine 10, which is schematically illustrated in FIG. 1 and includes an exhaust 12 which drives a turbine 14 of a turbocharger 16. The turbine drives a turbocharger compressor 18, which receives air from an air cleaner 20 and delivers supercharged air at approximately 2⅓ atmospheres to the engine intake through an intercooler 22, which cools the turbocharged air before it is delivered to the engine intake.

The engine has a cylinder block 24 and a head 26, which has a flat bottom face 28 having an associated head gasket 30 to seal the joint between the bottom face of the head and the top of the cylinder block. The block 24 has a plurality of identical cylinders 32. Since the cylinders are identical, only a single cylinder is illustrated, and only that portion of the block 24 and head 26 adjacent the cylinder is illustrated.

Figure 8:
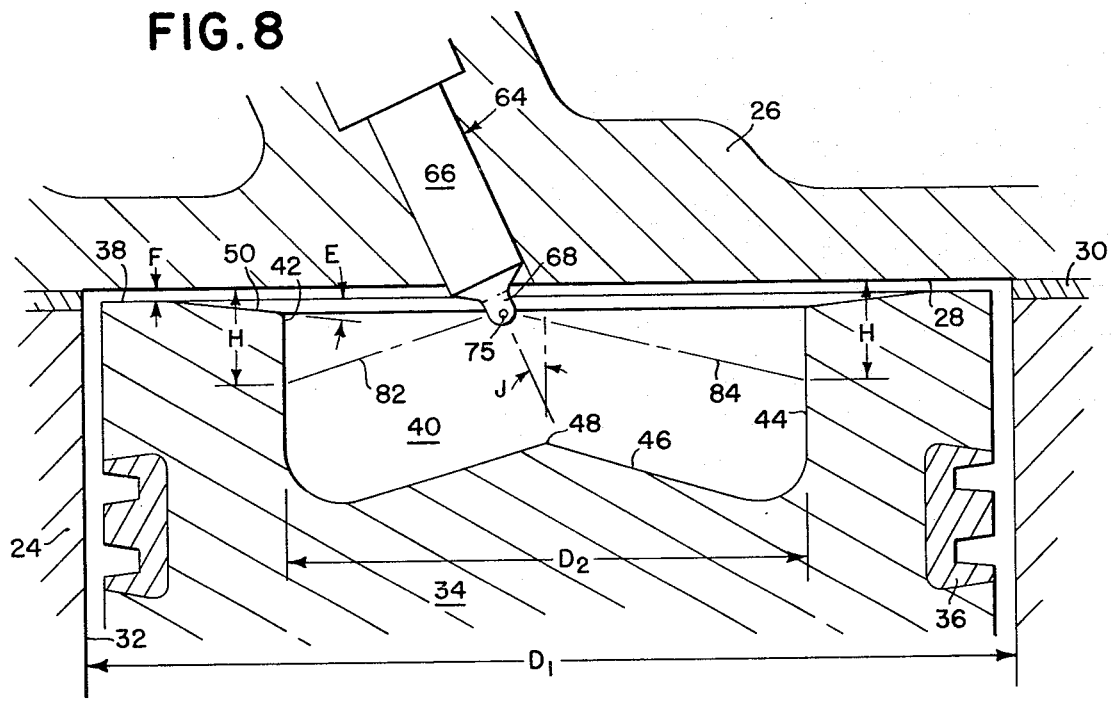
FIG. 8 is an enlarged section of the combustion chamber with the piston at top dead center.
Figure 9:
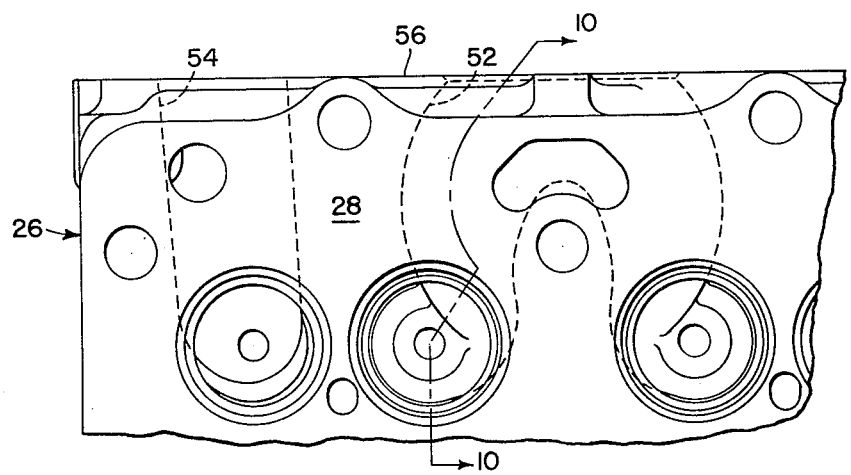
FIG. 9 is a plan view of a portion of the bottom face of the cylinder head showing the intake valve porting.
Figure 10:
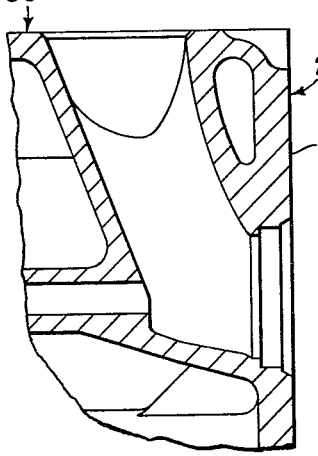
FIG. 10 is a section view as seen generally along the line 10—10 of FIG. 9.
Figure 12:
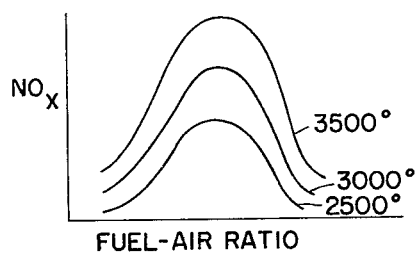
FIG. 12 is a graph showing the theoretical relationship between combustion temperatures, air-fuel ratios, and oxides of nitrogen formation.

A piston 34 reciprocates in the cylinder 32 in a 4.75 inch stroke, in the illustrated embodiment, and has a piston ring insert 36 of known construction, the piston rings not being illustrated. The piston has a top face 38 opposite the bottom face 28 of the head, and the piston face 38 is provided with an open toroidal combustion chamber or recess 40 having a circular opening 42 in the piston top face 38 coaxial with the cylinder. The walls of the combustion chamber are a surface revolution about the axis of the piston, the curve rotated to form the surface having a vertical segment parallel to the piston axis and curving more than 90° to a bottom segment intersecting the piston axis at an angle of 18°, so that the combustion chamber has a cylindrical outer wall portion 44, the lower part of which curves into a somewhat flat, conical bottom wall 46 having its apex 48 on the piston axis. The depth of the combustion chamber is selected to provide a given compression ratio, which is 16.4 to 1 in the illustrated embodiment, the preferred compression ratio being in the range between 14.5 and 16.5 to 1. The diameter of the combustion chamber in the illustrated embodiment, indicated at $D_2$ in FIG. 8, is 2.8 inches as compared to the 4.25 cylinder bore diameter, indicated by $D_1$ in FIG. 8, so that the ratio between the cylinder diameter squared and the combustion chamber diameter squared is 2.30, the acceptable ratio being in the range between 2.00 and 3.50, although a smaller range of from 2.2 to 3.3 is preferred.

For reasons set forth hereinafter, it is desirable to keep the clearance between the top face 38 of the piston and the bottom face 28 of the head at the top of the piston stroke at a minimum, this clearance being indicated by the letter F in FIG. 8. Ideally, in the present embodiment this clearance is maintained at less than 0.010 inch under full load operating conditions although a clearance up to 0.020 inch could be provided. Since the piston is made of different material and becomes much hotter than the cylinder block, it experiences a greater thermal growth, which is compounded by a growth due to inertia forces, experience having proven that a piston of the type and size described will grow between 0.030 and 0.035 inches between its static condition and its full load operating condition, so that to maintain a full load clearance of less than 0.010 inch, the initial static clearance must be 0.040 inch. It has also been discovered that the central portion of the piston will experience a greater growth than the outer peripheral portions, and to compensate for the greater growth, an annular tapered area 50 is provided on the top face 38 coaxially surrounding the circular opening 42 of the combustion chamber. The taper extends upwardly and outwardly at a small degree relative to the horizontal. In FIG. 8 the taper is exaggerated for practical purposes, and in the preferred embodiment a taper of 0°, 22' from the horizontal is provided to give approximately 0.006 inch additional clearance adjacent the combustion chamber, the outer diameter of the tapered area being approximately 4.00 inches.

The head is provided with intake ports 52 and exhaust ports 54, which open onto a lateral side 56 of the head and there respectively communicate with intake and exhaust manifolds in the conventional manner. The intake ports for adjacent cylinders open onto a common opening on the side 56, while each exhaust port 54 has an individual connection to the exhaust manifold. The intake and exhaust ports 52 and 54 make right-angle turns and open onto the bottom face 28 of the head, and intake and exhaust valves 58 and 60 respectively are disposed in the intake and exhaust port openings in a well known manner for valve-in-head engines, the valve stems extending upwardly through the head.

As is apparent from FIG. 5, the valves 58 and 60 are equidistantly offset from the axis of the cylinder on the same side of the cylinder axis, the plane through the axes of the valves being offset a short distance from the axis of the cylinder. The intake port is designed to produce a rotation of the air mass about the valve axis as it enters the cylinder, and the location of the valve relative to the cylinder axis causes an additional rotation of the air within the cylinder, the air rotating in the direction of the arrow in FIG. 5 in a vortex about the cylinder axis. This air rotation is commonly referred to as the air swirl, and, in the illustrated embodiment, the air rotation is controlled to give an average rotational speed of approximately 3800 rpm at normal full load engine speed of 2200 rpm, when recorded at a diameter that is 0.7 of the diameter of the cylinder bore and at a depth in the cylinder equal to the stroke of the piston, and when the intake valve is between 55% and full valve lift. This air flow can be recorded by a paddle wheel anemometer disposed in the cylinder at the above-noted depth and having a distance between the centers of opposite paddles of 0.7 times the cylinder diameter. During this test, the air flow is held constant at a rate of approximately 165 cfm, which is established by multiplying the displacement times the engine speed times 2 times 0.85. As is well known in the art, the above-described swirl rate can be controlled by the location of the valve and the configuration of the inlet port. It is also known to control the swirl rate by baffles or the like in the inlet port. Although a 3800 rpm swirl rate as measured by the above procedure is provided in the illustrated embodiment, a range of swirl rates encompassing said rate could be provided, such as a range of 3400–3900 rpm. For different cylinder diameter to combustion chamber diameter ratios, and different fuel spray patterns, different swirl rates are preferred so that an overall range of swirl rate from 3000–6000 rpm could be acceptable, although more narrow ranges of 3200–5000, or 3300–4800, or 3400–4500, for example, are preferred.

Figure 6:
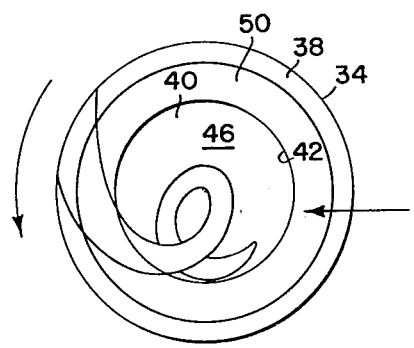
FIG. 6 is a schematic plan view similar to FIG. 5, but on a smaller scale, and showing the air flow pattern at approximately 10° before the piston reaches the top of its stroke.
Figure 7:
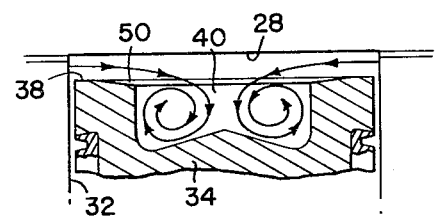
FIG. 7 is a section view of the piston shown in FIG. 6 schematically illustrating the air flow in elevation.

The above-described air rotation continues until the intake valve closes. After valve closure, and during the compression cycle, the rotational speed of the air accelerates as the result of the air being forced into the combustion chamber 40, since the air rotating in the combustion chamber moves at a lesser diameter than in the cylinder. This air flow into the combustion chamber is normally referred to as "squish". The air flow pattern at approximately 10° before top dead center, or the top of the piston stroke, is schematically illustrated in FIG. 6, which is a plan view, while FIG. 7 provides a schematic sectional view of the air flow. As is apparent, the air is rapidly accelerated from the clearance between the top face of the piston and the bottom face of the cylinder head. The less the ultimate clearance between the top of the piston face and the cylinder head, the greater the additional acceleration given to the air, and the above-described minimum clearance is provided to obtain maximum "squish". The air acceleration rate or "squish" is also affected by the ratio between the combustion chamber diameter and the cylinder diameter.

At approximately 10°–15° before top dead center during the compression stroke, fuel is injected into the cylinder from the injection nozzle, indicated in its entirety by the numeral 64. Such fuel injection nozzles are generally well known, and the nozzle 64 forms a part of a conventional fuel delivery system, which includes a fuel injection pump and fuel delivery lines from the pump to the nozzles. The injection nozzle extends through the head at an angle relative to the axis of the cylinder and includes a body 66 mounted in a bore in the head and having a nipple-like tip 68 extending below the bottom face 28 of the head into the cylinder 32. The end of the tip is hemispherical and the entire body 66, including the tip 68, is hollow, the hollow center of the nozzle having a conical valve seat 70 with an associated needle-type valve 72. All of the above represents conventional nozzle design. The axis of the nozzle is inclined 24° from the axis of the cylinder, and the nozzle tip is offset a relatively short distance from the centerline of the cylinder. The angled nozzle is provided so that it will not interfere with the valves in the cylinder head, the angle of intersection between the cylinder axis and the axis of the nozzle being identified by the letter J in FIG. 3.

As best seen in FIGS. 3 and 4, the nozzle tip 68 here has four cylindrical orifices 74, 75, 76 and 77, respectively, through the wall of the tip. The axes of the orifices intersect at the center of curvature of the hemispherical tip end, which is located in this case at approximately 0.153 inch below the bottom face of the head, the distance being identified by the letter G in FIG. 3. The orifices preferably have a diameter of 0.013 each and the wall thickness of the tip is approximately 0.028 each. The relationship between the orifice diameter and the length of the orifice affects the penetration of the fuel during the injection process, and the length of the orifice, indicated by the dimension L in FIG. 3, is preferably 1.5 to 2.5 times the diameter of the orifice, indicated by the letter D.

The included angle on the hemispherical tip between opposite orifices is 155°, the included angle between the orifice 74 and the orifice 76 being indicated by the letter A in FIG. 3. The centerline between the orifices, or the line that makes a 77½° angle with each orifice axis, makes a 22° angle with the axis of the nozzle, the angle being indicated by the letter K in FIG. 3. FIG. 4 is an end view along this centerline, and, as is apparent, the orifices are spaced at 90° intervals when viewed from said 22° angle. Since the nozzle angle makes a 24° angle with the axis of the cylinder, the angle that each nozzle makes with the horizontal plane normal to the cylinder axis is different. In FIG. 3, the horizontal plane through the center of curvature of the tip is indicated by the axis 80, and the centerline 82 of the orifice 74 makes an angle M with the plane 80, while the ais 84 of the orifice 76 makes an angle N with the horizontal plane 80, the angle N being less than the angle M. In the illustrated embodiment, since the angle K is 2° less than the angle J, the angle M is 14½° while the angle N would be 10½°. However, the fuel ejected from the orifice 76 must travel a greater distance before it reaches the side wall 44 of the combustion chamber than the fuel ejected from the nozzle 74, and the difference in the angles of the orifices 74 and 76 compensates for the differences in distance from the combustion chamber wall, so that the axis 84 intersects the combustion chamber wall 44 at the same distance from the top of the piston as the axis 84. As indicated in FIG. 8, the axes 82 and 84 intersect the side wall 44 at the same distance H from the bottom face of the head, so that the centerline of the spray from each orifice impinges on the combustion chamber wall at the samed height.

Figure 11:
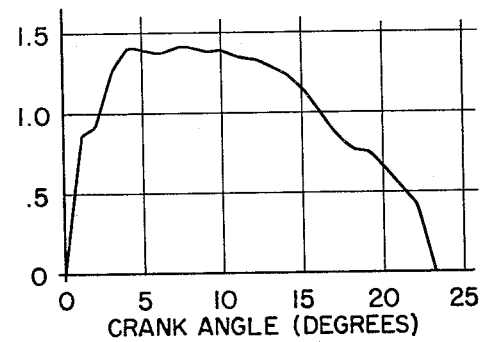
FIG. 11 is a graph showing the preferred fuel injection rate.

In the preferred embodiment, the fuel injection line pressure reaches approximately 5500 psi during the injection and the nozzle needle lift is approximately 0.015 inch, which combine to give a fuel injection rate shown in FIG. 11.

In operation, the air swirls in the cylinder at an average rotational speed of 3400–3900 rpm as described above during the intake stroke of the engine. During the compression stroke, the air is further accelerated in the manner described, and at approximately 10° before top dead center, fuel is injected through the orifices in the nozzle. The rotating air deflects the emerging fuel in a pattern shown in FIG. 5, the air being mixed with the fuel as a result of both the rotational air velocity or swirl and the air acceleration or "squish". As shown in FIG. 5, the rotating air deflects the fuel spray approximately 10°–15°, which is indicated by the letter C in FIG. 5, before the spray strikes the combustion chamber wall. The core section of the spray "plume" is represented by the dashed lines, while the lean area on the advance side relative to the direction of rotation is indicated by dots in FIG. 5; the further in advance of the spray the leaner the mixture. Ignition occurs at the lean areas of the spray and at the boundary layer of the leading edge of the main spray. Some of the fuel is burned as liquid in the lean area of the spray, while the rest of the fuel burns after it reaches the chamber wall and evaporates. With the illustrated compression ratio of 16.4 to 1, the pressure at time of ignition is approximately 1300 psi, which gives a peak pressure of approximately 1900 psi and a combustion temperature of approximately 3700°F. If a smaller compression ratio is utilized, the pressures and temperatures are obviously lower, a compression ratio of 15.3 to 1, for example, giving a 1150–1250 psi precombustion pressure, a 1650–1850 psi peak pressure and a 3500°–3600°F. combustion temperature.

The novel arrangement of components, including the combustion chamber, the air flows and spray pattens, produces the controlled burning, which not only results in good engine performance, but in very low exhaust emissions. It is theorized that the burning rate is affected by the relationship between the amount of fuel burned as liquid in the lean or "fuzz" area of the spray and the amount burned as a vapor after evaporating off the chamber wall and also by the air supply at the burning site. The above factors are, in turn, affected by the air swirl and air "squish", the combustion chamber volume diameter and the relationship between the combustion chamber diameter and the cylinder diameter, the air-to-fuel ratios, and the fuel spray, which in turn is established by the nozzle design and the injection timing and rates. Even the above is perhaps an oversimplification. In any event, the novel combination of combustion system components has produced a high output engine with low oxides of nitrogen emissions. For example, in one test a nonturbocharged engine of the above design was below the California regulations for 1973, while a turbocharged version of the engine, rather than exhibiting increased emissions as is the case in most engines, exhibited substantially lower emissions of both hydrocarbons and oxides of nitrogen, so that with only a small improvement in hydrocarbon emissions, which can be easily obtained, the engine would meet the California regulations for 1975 engines. The addition of an intercooler to further increase the horsepower, not only did not increase the emissions, but brought the emissions to a point below the stringent California regulations for 1975 engines. Thus, the novel combustion system not only does not require the derating of an engine to meet emission regulations, but allows the upgrading of the engine while decreasing the exhaust emissions.

We claim:

1. In a diesel engine having a cylinder, a piston, and a head, the improvement comprising: a combustion chamber in the piston including a generally cylindrical outer wall portion, the diameter of the piston being between 1.4 and 1.85 times the diameter of the combustion chamber, said piston reciprocating in a cylinder and having less than 0.020 inch clearance from the head at the top of the piston stroke under full load operating conditions, providing a compression ratio between 14 and 17 to 1, said piston having an annular tapered area adjacent to and surrounding the combustion chamber opening on the top face under static conditions, the tapered area being inclined upwardly and outwardly at an angle of less than 1° relative to the plane normal to the cylinder axis under static conditions to provide a greater static clearance between the inner portion of the top face and the head than the outer portion to compensate for greater thermal growth of the inner portion of the piston body than the outer portion under full load operating conditions; fuel injection means including a nozzle mounted in the head with a nozzle tip projecting into the chamber at the top of the piston stroke and having orifice means for spraying fuel within the combustion chamber so that the spray impinges on the outer wall portion of the combustion chamber; an air delivery means including an air inlet port and an air inlet valve in the head operative to deliver air in the cylinder in a vortex during the intake stroke of the piston, the swirling air being accelerated in the combustion chamber during the compression stroke of the piston and reacting with the fuel spray therein so that a portion of the fuel burns before it hits the outer wall portion of the combustion chamber and the remainder of the fuel evaporates from the upper wall portion and burns in the vapor state.

2. A diesel engine comprising: a cylinder block having a plurality of cylinders; a head having intake and exhaust passage means with intake and exhaust valve means; supercharger means operative to deliver supercharged air at a pressure between 2 and 3 atmospheres to the cylinders through the intake passage means and the intake valve means in a vortex about the cylinder axis; intercooler means for cooling said supercharged air; a piston in each cylinder, each piston having an annular top face having less than 0.020 inch clearance from the head at the top of the piston stroke when the engine is operating under full load conditions and a cup-shaped combustion chamber in the top face with a generally cylindrical side wall providing a compression ratio between 14 and 17 to 1, the diameter of the piston being between 1.4 and 1.85 times the diameter of the combustion chamber, said top face having an annular tapered area coaxially surrounding the combustion chamber and inclined upwardly and outwardly at less than 1° from the horizontal under non-operating conditions to compensate for greater thermal growth of the central portion of the piston than the peripheral portion under full load conditions and to thereby maintain a substantially level top face when the engine is operating under full load; and fuel injector means including a nozzle extending through the head and into each cylinder at an angle to and offset from the cylinder axis and including a plurality of nozzle orifices arranged to spray fuel on the combustion chamber wall at approximately equiangular intervals and approximately equal heights from the top face of the piston, said spray commencing approximately 10° before the top of the pisston stroke and continuing for approximately 20°–25°, substantially all of the swirling air in each cylinder being accelerated into the combustion chamber during the compression stroke of the piston and reacting with the fuel spray in the combustion chamber to ignite and burn the fuel at less than 3800°F. and 2000 psi peak pressure so that less than 16 grams of hydrocarbons plus oxides of nitrogen per brake horsepower hour are formed.

3. In a diesel engine having a cylinder, a piston, and a head, the improvement comprising: a combustion chamber in the piston including a generally cylindrical outer wall portion, the diameter of the piston being between 1.4 and 1.85 times the diameter of the combustion chamber, said piston reciprocating in the cylinder and having less than 0.020 inch clearance from the head at the top of the piston stroke under full load operating conditions providing a compression ratio between 14 and 17 to 1; fuel injection means including a nozzle mounted in the head with a nozzle tip projecting into the chamber at the top of the piston stroke and having at least three orifices for spraying fuel within the combustion chamber so that the spray from each orifice impinges on the outer wall portion at approximately equiangular intervals about the combustion chamber axis and at approximately the same height from the top of the piston, said fuel injection means delivering fuel to the combustion chamber at a rate which increases from 0 to between 1.1 and 1.6 cubic mm per crank angle degree as the engine turns through 5° of crank angle, maintaining said rate of between 1.1 and 1.6 cubic mm per degree as the engine turns the next 8°, and then returning gradually to 0 during the next 7° to 12° of engine turn; and air delivery means including an air inlet port and an air inlet valve in the head operative to deliver air in the cylinder in a vortex during the intake stroke of the piston, means for supercharging the air delivered to the intake port, an intercooler means for cooling the supercharged air before it is delivered to the intake port, the swirling air being accelerated into the combustion chamber during the compression stroke of the piston and reacting with the fuel spray therein so that a portion of the fuel burns before it hits the outer wall portion of the combustion chamber and the remainder of the fuel evaporates from the upper wall portion and burns in the vapor state.

4. The invention defined in claim 3 wherein the combustion chamber is generally coaxial with the piston.

* * * * *